United States Patent
Koizumi et al.

(10) Patent No.: US 9,625,681 B2
(45) Date of Patent: Apr. 18, 2017

(54) IMAGING LENS AND IMAGING APPARATUS PROVIDED WITH THE SAME

(71) Applicant: FUJIFILM Corporation, Tokyo (JP)

(72) Inventors: Noboru Koizumi, Saitama-ken (JP); Hideo Kanda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 14/864,772

(22) Filed: Sep. 24, 2015

(65) Prior Publication Data

US 2016/0011406 A1 Jan. 14, 2016

Related U.S. Application Data

(63) Continuation of application No. PCT/JP2013/007616, filed on Dec. 26, 2013.

(30) Foreign Application Priority Data

Mar. 29, 2013 (JP) ................................. 2013-072273

(51) Int. Cl.
*G02B 13/18* (2006.01)
*G02B 9/60* (2006.01)
(Continued)

(52) U.S. Cl.
CPC ......... *G02B 13/0045* (2013.01); *G02B 5/005* (2013.01); *G02B 9/60* (2013.01);
(Continued)

(58) Field of Classification Search
CPC ...... G02B 13/0045; G02B 9/60; G02B 13/18; G02B 5/005; G02B 13/0015; G02B 13/002; G02B 3/04
(Continued)

(56) References Cited

U.S. PATENT DOCUMENTS 8,179,613 B2 5/2012 Sano
8,179,615 B1 5/2012 Tang et al.
(Continued)

FOREIGN PATENT DOCUMENTS

CN 101710207 5/2010
CN 202110325 1/2012
(Continued)

OTHER PUBLICATIONS

"Written Opinion of the International Searching Authority of PCT/JP2013/007616", dated on Jan. 4, 2014, with partial English translation thereof, pp. 1-4, in which listed references (Ref.1-5) were cited.

*Primary Examiner* — Evelyn A Lester
(74) *Attorney, Agent, or Firm* — Jianq Chyun IP Office

(57) ABSTRACT

An imaging lens consists of five lenses consisting of, in order from the object side, a biconvex first lens, a biconcave second lens, a positive third lens having a meniscus shape with the convex surface toward the image side, a positive fourth lens having a meniscus shape with the convex surface toward the image side, and a negative fifth lens having a concave surface toward the image side, and having at least one inflection point on the image-side surface thereof, wherein condition expression (1), $0<f/f3<0.6$, relating to the focal length f of the entire system and the focal length f3 of the third lens, and condition expression (2), $0.12<D7/f<0.3$, relating to the focal length f of the entire system and the distance D7 between the third lens and the fourth lens along the optical axis are satisfied.

20 Claims, 10 Drawing Sheets

(51) Int. Cl.
*G02B 13/00* (2006.01)
*G02B 5/00* (2006.01)
*G02B 27/00* (2006.01)
*G02B 3/04* (2006.01)

(52) U.S. Cl.
CPC ............ *G02B 27/0025* (2013.01); *G02B 3/04* (2013.01); *G02B 13/002* (2013.01); *G02B 13/0015* (2013.01); *G02B 13/18* (2013.01)

(58) Field of Classification Search
USPC .................................. 359/714, 739, 763, 764
See application file for complete search history.

(56) References Cited

U.S. PATENT DOCUMENTS

| | | | | |
|---|---|---|---|---|
| 9,019,628 | B1* | 4/2015 | Chang | G02B 9/60 359/714 |
| 9,036,276 | B2* | 5/2015 | Liou | G02B 13/0045 359/765 |
| 2010/0220229 | A1 | 9/2010 | Sano | |
| 2010/0254029 | A1* | 10/2010 | Shinohara | G02B 9/60 359/764 |
| 2011/0188131 | A1 | 8/2011 | Sano | |
| 2011/0249346 | A1* | 10/2011 | Tang | G02B 13/0045 359/764 |
| 2011/0273611 | A1 | 11/2011 | Matsusaka et al. | |
| 2012/0140104 | A1 | 6/2012 | Ozaki | |
| 2013/0088635 | A1 | 4/2013 | Sano | |
| 2013/0229567 | A1 | 9/2013 | Sano | |
| 2015/0168687 | A1* | 6/2015 | Kondo | G02B 13/0045 359/714 |
| 2015/0188492 | A1* | 7/2015 | Nardi | H03K 3/0231 331/177 R |
| 2015/0226939 | A1* | 8/2015 | Kanda | G02B 9/60 359/714 |
| 2015/0286036 | A1* | 10/2015 | Kondo | G02B 13/0045 359/714 |
| 2015/0293332 | A1* | 10/2015 | Kondo | G02B 13/0045 359/714 |
| 2015/0309287 | A1* | 10/2015 | Kondo | G02B 13/0045 359/714 |
| 2016/0004034 | A1* | 1/2016 | Nishihata | G02B 13/0045 359/714 |

FOREIGN PATENT DOCUMENTS

| | | |
|---|---|---|
| JP | 2010224521 | 10/2010 |
| WO | 2011004467 | 1/2011 |
| WO | 2011021271 | 2/2011 |
| WO | 2011027690 | 3/2011 |
| WO | 2012020554 | 2/2012 |

* cited by examiner

FIG.3 EXAMPLE 3

FIG.8 EXAMPLE 3

IMAGING LENS AND IMAGING APPARATUS PROVIDED WITH THE SAME

CROSS-REFERENCE TO RELATED APPLICATIONS

This application is a Continuation of PCT International Application No. PCT/JP2013/007616 filed on Dec. 26, 2013, which claims priority under 35 U.S.C. §119(a) to Japanese Patent Application No. 2013-072273 filed on Mar. 29, 2013. Each of the above applications is hereby expressly incorporated by reference, in its entirety, into the present application.

BACKGROUND

The present disclosure relates to a fixed-focus imaging lens that forms an optical image of a subject on an image sensor, such as a CCD (Charge Coupled Device) or CMOS (Complementary Metal Oxide Semiconductor), and an imaging apparatus that is provided with the imaging lens and performs imaging, such as a digital still camera, a mobile phone with camera, a personal digital assistance (PDA), a smartphone, a tablet-type terminal, a portable video game player, etc.

Along with the spread of personal computers in ordinary homes, etc., digital still cameras that are capable of inputting image information, such as photographed landscapes and portraits, to a personal computer are also rapidly spreading. Further, more and more mobile phones, smartphones, and tablet-type terminals are equipped with a camera module for inputting images. The above-mentioned devices capable of imaging use an image sensor, such as a CCD or CMOS. In recent years, such image sensors having increasingly higher image density are developed, and there is a demand for a higher resolution and higher performance imaging lens. This trend is particularly pronounced for smartphones. The main stream of imaging lenses mounted on recent smartphones have a five-lens configuration. Examples of the imaging lens having a five-lens configuration used in this field are proposed in U.S. Pat. No. 8,179,613, Chinese Utility Model Registration No. 202110325, and Chinese Patent Application Publication No. 101710207 (hereinafter, Patent Documents 1 to 3, respectively).

SUMMARY

Also, the image sensors are becoming more and more compact in recent years, and there are demands for compact imaging apparatuses and compact imaging lenses to be mounted on the imaging apparatuses. Further, for an imaging lens for use, in particular, with devices that are becoming thinner and thinner, such as mobile phones, smartphones, and tablet-type terminals, there is an increasing demand for reduction of the entire length of the lens. In order to meet the above-described demands, it is desired to achieve further reduction of the entire length of the imaging lens having a five-lens configuration, such as those disclosed in Patent Documents 1 to 3.

In view of the above-described circumstances, the present disclosure is directed to providing an imaging lens that is capable of achieving high imaging performance that can accommodate high image density while reducing the entire length, and an imaging apparatus provided with the imaging lens and capable of obtaining high-resolution images.

An imaging lens of the disclosure consists of five lenses consisting of, in order from the object side:
a first lens having a biconvex shape;
a second lens having a biconcave shape;
a third lens having a positive refractive power and having a meniscus shape with the convex surface toward the image side;
a fourth lens having a positive refractive power and having a meniscus shape with the convex surface toward the image side; and
a fifth lens having a negative refractive power, having a concave surface toward the image side, and having at least one inflection point on the image-side surface thereof
wherein the condition expression below is satisfied:

$$0 < f/f3 < 0.6 \tag{1}$$

and $$0.12 < D7/f < 0.3 \tag{2},$$

where f is a focal length of the entire system, f3 is a focal length of the third lens, and D7 is a distance between the third lens and the fourth lens along the optical axis.

It is preferred that the imaging lens of the disclosure satisfy any of the conditional expressions (1-1) to (8-1) below. In preferred aspects of the disclosure, any one or any combination of the conditional expressions (1-1) to (8-1) may be satisfied.

$$0 < f/f3 < 0.5 \tag{1-1}$$

$$0 < f/f3 < 0.4 \tag{1-2}$$

$$0.13 < D7/f < 0.25 \tag{2-1}$$

$$0.14 < D7/f < 0.2 \tag{2-2}$$

$$1.5 < f/f1 < 3 \tag{3}$$

$$1.7 < f/f1 < 2.7 \tag{3-1}$$

$$1.85 < f/f1 < 2.5 \tag{3-2}$$

$$-5 < f/f5 < -1 \tag{4}$$

$$-4 < f/f5 < -1.2 \tag{4-1}$$

$$0 < f1/f3 < 0.5 \tag{5}$$

$$0 < f1/f3 < 0.4 \tag{5-1}$$

$$0 < (R3f - R3r)/(R3f + R3r) < 0.6 \tag{6}$$

$$0 < (R3f - R3r)/(R3f + R3r) < 0.55 \tag{6-1}$$

$$0.2 < f \tan \omega / R5r < 10 \tag{7}$$

$$0.5 < f \tan \omega / R5r < 5 \tag{7-1}$$

$$-2 < f/f2 < -0.5 \tag{8}$$

$$-1.8 < f/f2 < -0.7 \tag{8-1}$$

where f is a focal length of the entire system,
f1 is a focal length of the first lens,
f2 is a focal length of the second lens,
f3 is a focal length of the third lens,
f5 is a focal length of the fifth lens,
R3f is a paraxial radius of curvature of the object-side surface of the third lens,
R3r is a paraxial radius of curvature of the image-side surface of the third lens, R5r is a paraxial radius of curvature of the image-side surface of the fifth lens, D7 is a distance between the third lens and the fourth lens along the optical axis, and ω is a half angle of view.

It is preferred that the imaging lens of the disclosure further include an aperture stop disposed on the object side of the object-side surface of the second lens.

It should be noted that, with respect to the imaging lens of the disclosure, the expression "consisting of five lenses" means that the imaging lens of the disclosure may include, in addition to the five lenses: lenses substantially without any power; optical elements other than lenses, such as a stop and a cover glass; mechanical components, such as a lens flange, a lens barrel, an image sensor, and a camera shake correcting mechanism; etc.

It should be noted that the sign (positive or negative) with respect to the surface shape and the refractive power of any lens having an aspheric surface of the above-described imaging lens of the disclosure and the preferred features thereof is about an area of the lens in the vicinity of the optical axis (paraxial region), unless otherwise noted. The sign with respect to the radius of curvature is provided such that a positive radius of curvature indicates a surface shape that is convex toward the object side, and a negative radius of curvature indicates a surface shape that is convex toward the image side.

An imaging apparatus according to the disclosure is provided with the imaging lens of the disclosure.

According to the imaging lens of the disclosure, which has the five-lens configuration as a whole, the configuration of each lens element is optimized, and, in particular, the shapes of the first lens, the second lens, the third lens, the fourth lens, and the fifth lens are preferably configured to satisfy the given condition expressions to accomplish a lens system having high imaging performance while reducing the entire length.

Further, the imaging apparatus of the disclosure which is provided with the imaging lens of the disclosure allows reducing the size of the apparatus along the optical axis direction of the imaging lens and allows obtaining high-resolution images.

DETAILED DESCRIPTION OF THE PREFERRED EMBODIMENTS

Hereinafter, embodiments of the present disclosure will be described in detail with reference to the drawings.

Figure 1:
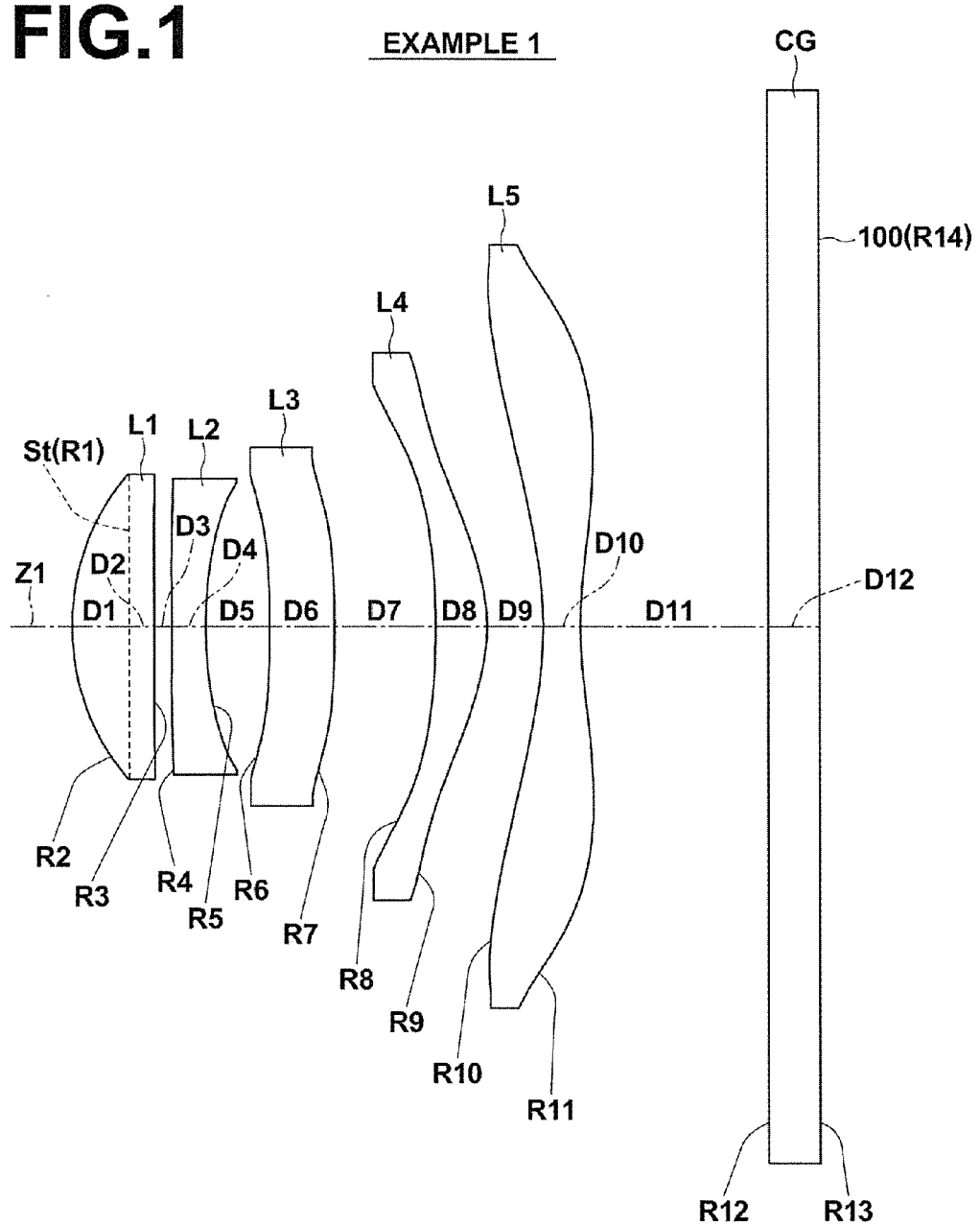
FIG. 1 is a lens sectional view illustrating a first configuration example of an imaging lens according to one embodiment of the disclosure and corresponding to Example 1.
Figure 2:
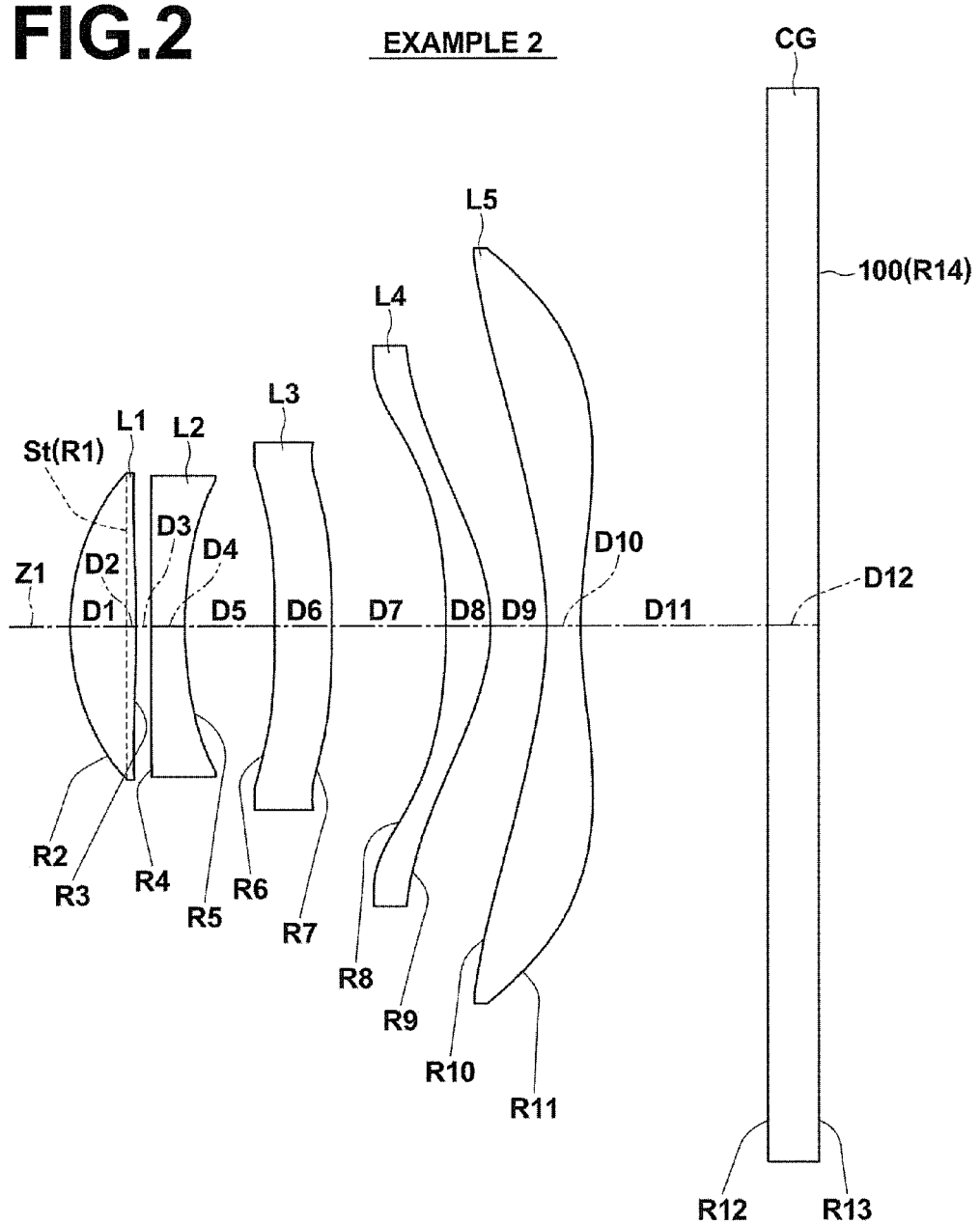
FIG. 2 is a lens sectional view illustrating a second configuration example of the imaging lens according to one embodiment of the disclosure and corresponding to Example 2.
Figure 3:
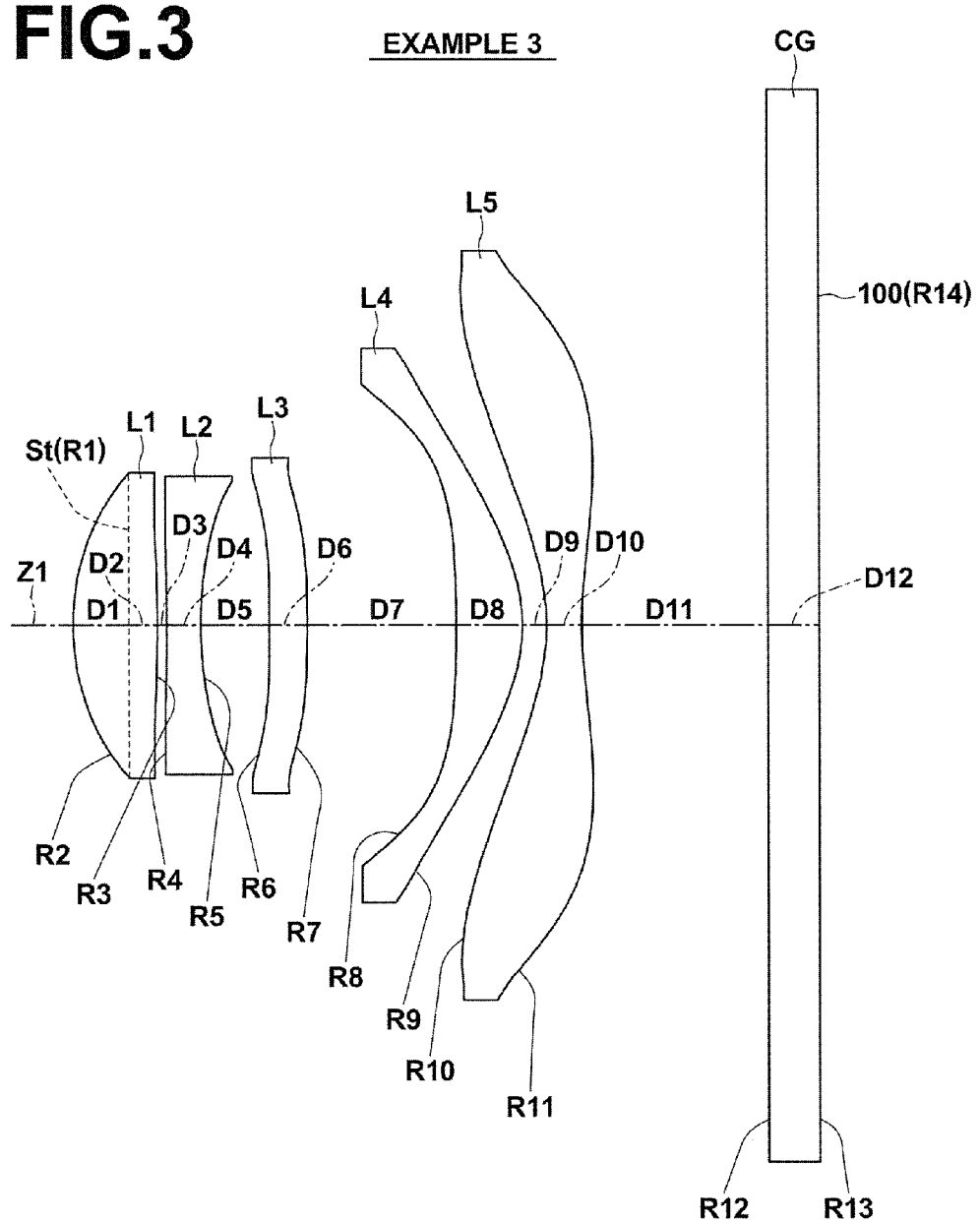
FIG. 3 is a lens sectional view illustrating a third configuration example of the imaging lens according to one embodiment of the disclosure and corresponding to Example 3.
Figure 4:
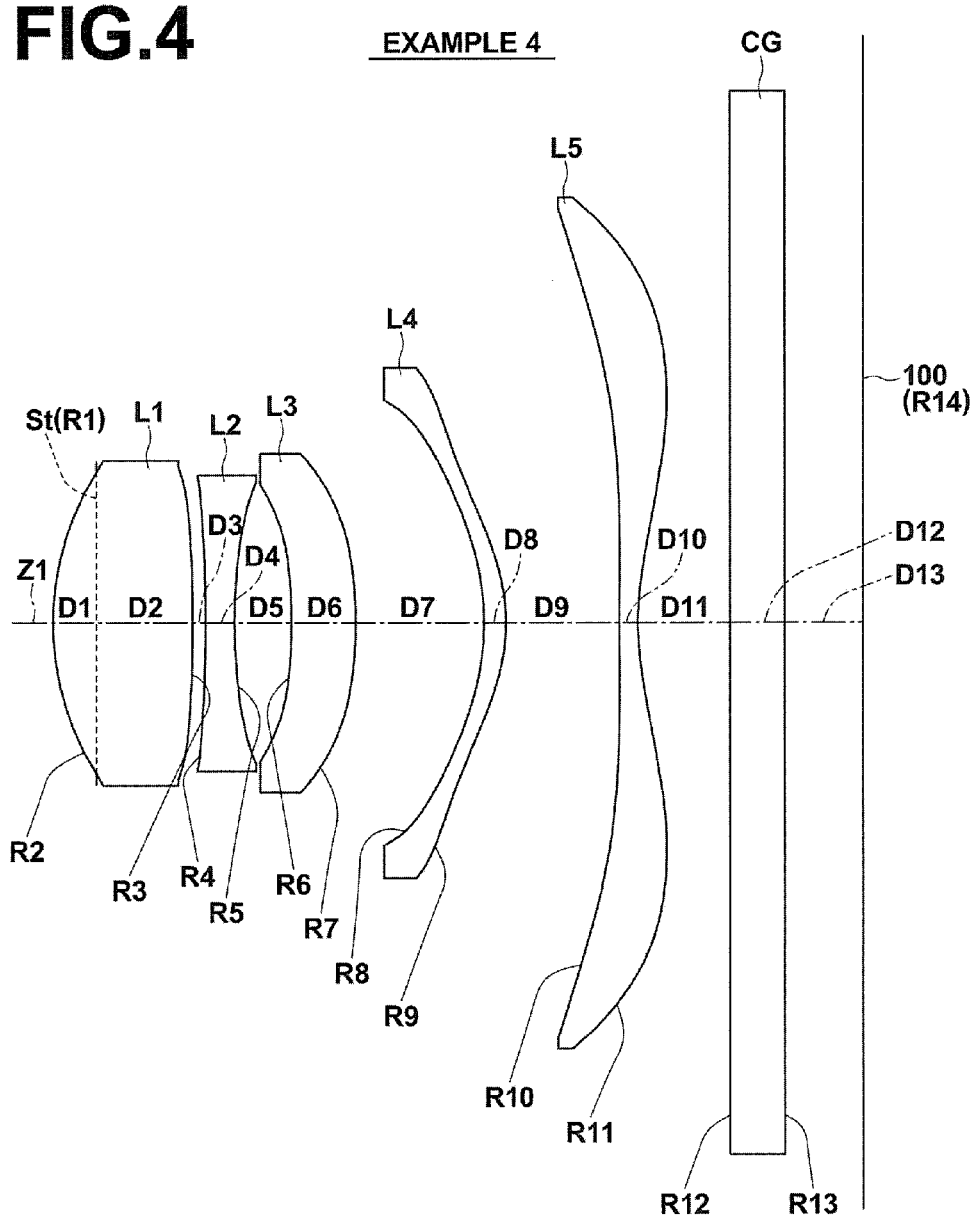
FIG. 4 is a lens sectional view illustrating a fourth configuration example of the imaging lens according to one embodiment of the disclosure and corresponding to Example 4.
Figure 5:
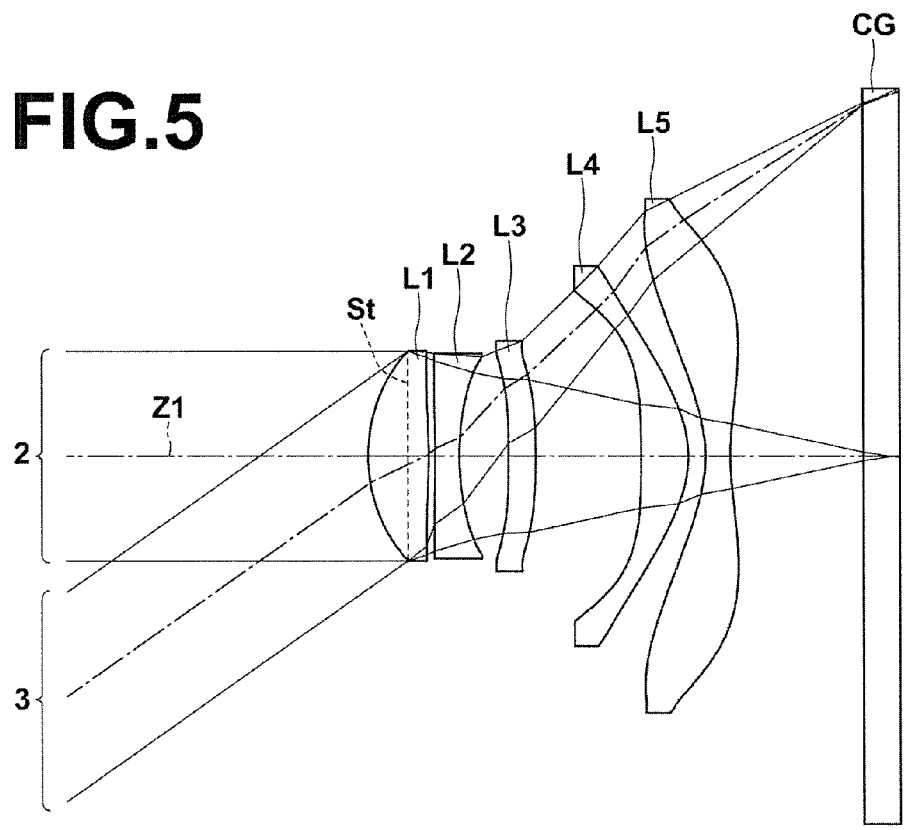
FIG. 5 is a diagram showing optical paths through the imaging lens shown in FIG. 3.

FIG. 1 shows a first configuration example of an imaging lens according to a first embodiment of the disclosure. This configuration example corresponds to the lens configuration of a first numerical example (shown in Tables 1 and 2), which will be described later. Similarly, FIGS. 2 to 4 show cross-sectional configurations of second to fourth configuration examples corresponding to the lens configurations of numerical examples (Tables 3 to 8) according to second to fourth embodiments, which will be described later. In FIGS. 1 to 4, each symbol "Ri" denotes a radius of curvature of the i-th surface (where i=1, 2, 3, . . . ), and each symbol "Di" denotes a surface distance between the i-th surface and the i+1-th surface along the optical axis Z1. It should be noted that these configuration examples have the same basic configuration. Therefore the following description is made based on the configuration example of the imaging lens shown in FIG. 1, and the configuration examples shown in FIGS. 2 to 4 are described as necessary. FIG. 5 is a diagram showing optical paths through the imaging lens shown in FIG. 3, and shows optical paths of an axial bundle of rays 2 and a bundle of rays at the maximum angle of view from an object point at infinity.

The imaging lens according to each embodiment of the disclosure is preferably usable with various imaging apparatuses using an image sensor, such as a CCD or CMOS, in particular, relatively small portable terminal devices, such as digital still cameras, mobile phones with camera, smartphones, tablet-type terminals, and PDAs.

Figure 10:
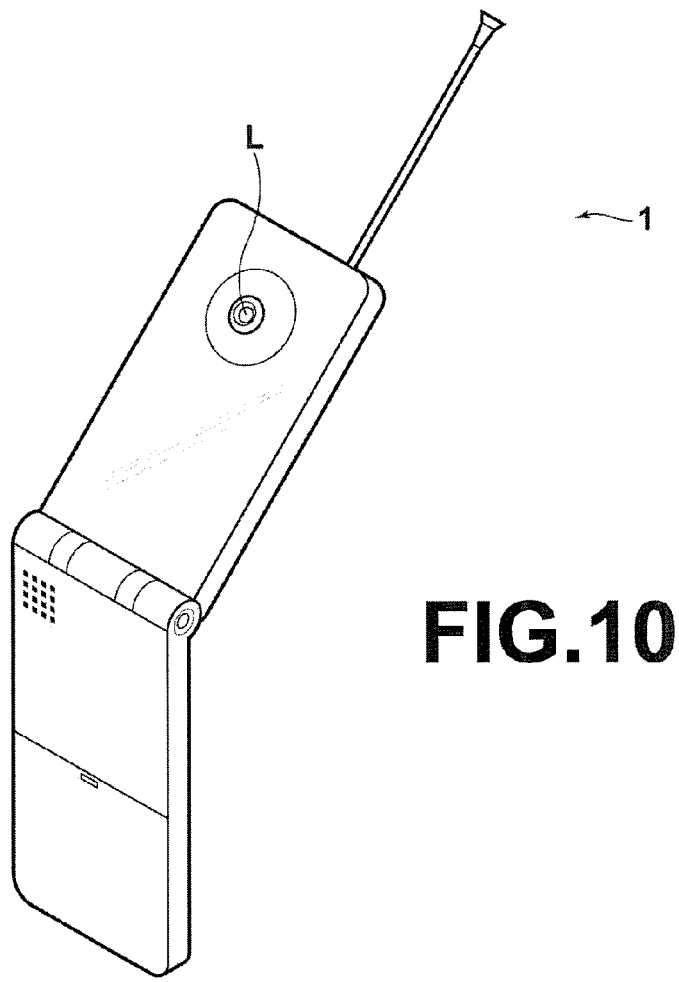
FIG. 10 shows an imaging apparatus in the form of a mobile phone terminal provided with the imaging lens according to one embodiment of the disclosure.

FIG. 10 shows the appearance of a mobile phone terminal which is an imaging apparatus 1 according to one embodiment of the disclosure. The imaging apparatus 1 of the embodiment of the disclosure includes the imaging lens L of an embodiment of the disclosure, and an image sensor 100 (see FIG. 1), such as a CCD, which outputs an imaging signal according to an optical image formed by the imaging lens L. The image sensor 100 is placed in the image plane (image plane R14) of the imaging lens L.

Figure 11:
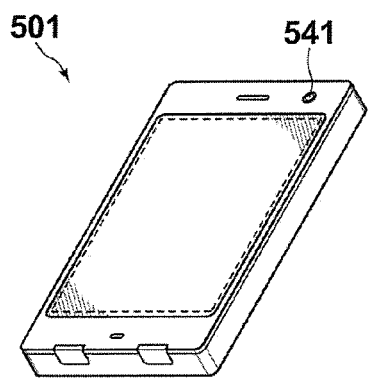
FIG. 11 shows an imaging apparatus in the form of a smartphone provided with the imaging lens according to one embodiment of the disclosure.

FIG. 11 shows the appearance of a smartphone which is an imaging apparatus 501 according to one embodiment of the disclosure. The imaging apparatus 501 of the embodiment of the disclosure includes a camera unit 541 which includes the imaging lens L of an embodiment of the disclosure and an image sensor 100 (see FIG. 1), such as a CCD, which outputs an imaging signal according to an optical image formed by the imaging lens L. The image sensor 100 is placed in the image plane (image plane R14) of the imaging lens L.

As shown in FIG. 1, this imaging lens L includes, in order from the object side along the optical axis Z1, a first lens L1, a second lens L2, a third lens L3, a fourth lens L4, and a fifth lens L5. In the imaging lens of each of the first to the third configuration examples shown in FIGS. 1 to 3, the position of the image-side surface of an optical member CG is the same as the position of the imaging surface of the image sensor 100 (the image plane R14).

Various types of optical member CG may be provided between the fifth lens L5 and the image sensor 100 depending on the configuration of the camera on which the lens is mounted. For example, a cover glass for protecting the imaging surface, and a plane parallel plate-like optical member, such as an infrared cut-off filter, may be provided between the fifth lens L5 and the image sensor 100. In this case, for example, a plane parallel plate-like cover glass with a coating having a filter effect, such as an effect of an infrared cut-off filter or ND filter, may be used as the optical member CG.

Alternatively, without using any optical member CG, the fifth lens L5 may be provided with a coating having the same effect as the optical member CG, for example. This allows reducing the number of parts forming the lens and reducing the entire length of the lens.

It is preferred that the imaging lens L include an aperture stop St disposed on the object side of the object-side surface of the second lens L2. Disposing the aperture stop St on the object side of the object-side surface of the second lens L2 in this manner allows suppressing increase of the incidence angle of rays traveling through the optical system onto the image plane (the image sensor), in particular, at the periphery of the imaging area. It is more preferred that the aperture stop St in the imaging lens L be disposed on the object side of the image-side surface of the first lens L1 along the optical axis direction. Disposing the aperture stop St on the object side of the image-side surface of the lens L1 allows more preferably suppressing increase of the incidence angle of rays traveling through the optical system onto the image plane (the image sensor), thereby achieving even higher optical performance.

It should be noted that the description "the aperture stop St is disposed on the object side of the object-side surface of the second lens" means that the position of the aperture stop St along the optical axis direction is the same position as the intersection between the axial marginal ray and the object-side surface of the second lens L2 or a position nearer to the object side than the intersection. The description "the aperture stop St is disposed on the object side of the image-side surface of the first lens" means that the position of the aperture stop St along the optical axis direction is the same position as the intersection between the axial marginal ray and the image-side surface of the first lens L1 or a position nearer to the object side than the intersection.

While the aperture stop St is disposed on the image side of the apex of the object-side surface of the first lens L1 in this embodiment, this is not intended to limit the invention, and the aperture stop St may be disposed on the object side of the apex of the object-side surface of the first lens L1. Disposing the aperture stop St on the object side of the apex of the object-side surface of the first lens L1 is somewhat disadvantageous in view of ensuring peripheral brightness than disposing the aperture stop St on the image side of the apex of the object-side surface of the first lens L1. However, this more preferably allows suppressing increase of the incidence angle of rays traveling through the optical system onto the image plane (the image sensor) at the periphery of the imaging area. It should be noted that the aperture stop St shown in each of FIGS. 1 to 5 does not necessarily represent the size and the shape of the aperture stop St, but represents the position of the aperture stop St along the optical axis Z1.

In the imaging lens L, the first lens L1 has a biconvex shape in the vicinity of the optical axis. The first lens L1 having a biconvex shape in the vicinity of the optical axis allows distributing the refractive power of the first lens L1 between the surfaces thereof. This allows preventing the refractive power at each surface of the lens L1 from becoming excessively strong while ensuring the positive refractive power, and is advantageous for correction of aberrations, such as spherical aberration, while achieving reduction of the entire length.

The second lens L2 has a biconcave shape in the vicinity of the optical axis. The second lens L2 having a negative refractive power in the vicinity of the optical axis allows successfully correcting chromatic aberration. The second lens L2 having a biconcave shape in the vicinity of the optical axis is advantageous for preventing over correction of spherical aberration while correcting chromatic aberration.

The third lens L3 has a positive refractive power in the vicinity of the optical axis, and is a meniscus lens with the convex surface toward the image side in the vicinity of the optical axis. The third lens L3 that is a meniscus lens with the convex surface toward the image side in the vicinity of the optical axis is advantageous for suppressing astigmatism. The third lens L3 having a positive refractive power is advantageous for correcting spherical aberration.

The fourth lens L4 has a positive refractive power in the vicinity of the optical axis, and is a meniscus lens having the convex surface toward the image side in the vicinity of the optical axis. The fourth lens L4 that is a meniscus lens having the convex surface toward the image side in the vicinity of the optical axis is advantageous for correcting astigmatism. The fourth lens L4 having a positive refractive power allows suppressing increase of the incidence angle of rays traveling through the optical system onto the image sensor 100, in particular, at the intermediate angle of view.

The fifth lens L5 has a negative refractive power in the vicinity of the optical axis. The fifth lens L5 having a negative refractive power in the vicinity of the optical axis is advantageous for reducing the entire length and correcting field curvature. The image-side surface of the fifth lens L5 has a concave surface toward the image side in the vicinity of the optical axis, and has at least one inflection point within the effective diameter. The description "having an inflection point" with respect to the image-side surface of the fifth lens L5 means that, assuming a curved line of the image-side surface at a cross-section of the lens including the optical axis Z1 within the effective diameter, the curved line includes a point at which the shape is changes from a convex shape to a concave shape (or from a concave shape to a convex shape). The position of the inflection point may be any position radially outward from the optical axis Z1 within the effective diameter of the image-side surface of the fifth lens L5. The image-side surface of the fifth lens L5 having a shape that has a concave surface toward the image side in the vicinity of the optical axis and has at least one inflection point within the effective diameter is advantageous for reducing the incidence angle of marginal rays onto the image plane while correcting field curvature.

Further, as shown in the first to the third configuration examples shown in FIGS. 1 to 3, it is preferred that the fifth lens L5 have a biconcave shape in the vicinity of the optical axis. The fifth lens L5 having a biconcave shape in the vicinity of the optical axis allows providing a sufficiently strong negative refractive power of the fifth lens L5 while preventing the absolute value of the curvature of each surface of the fifth lens L5 from becoming excessively large, and this is effective to reduce the entire length. Also, the fifth lens L5 having a biconcave shape in the vicinity of the optical axis allows preferably correcting field curvature.

Alternatively, as shown in the fourth configuration example shown in FIG. 4, it is preferred that the fifth lens L5 have a meniscus shape with the concave surface toward the image side. The fifth lens L5 having a meniscus shape with the concave surface toward the image side allows achieving reduction of the entire length while successfully correcting aberrations.

As described above, according to the imaging lens L of each embodiment of the disclosure, which has the five-lens configuration as a whole, the configuration of each lens element is optimized, and, in particular, the shapes of the first to the fifth lenses L1 to L5 are preferably configured to accomplish a lens system having high resolution performance while reducing the entire length.

The imaging lens can achieve even higher imaging performance by satisfying the above-described preferred conditions, as appropriate. The imaging apparatus according to each embodiment of the disclosure outputs an imaging signal according to an optical image that is formed by the high-performance imaging lens L of each embodiment of the disclosure, and therefore allows obtaining high-resolution images throughout from the central angle of view to the peripheral angle of view.

In order to achieve even higher performance, it is preferred that each of the first to the fifth lenses L1 to L5 of the imaging lens L has an aspheric surface on at least one side thereof.

Further, it is preferred that each of the lenses L1 to L5 forming the imaging lens L be a single lens rather than a cemented lens. In this case, the number of surfaces is greater than that in a case where any of the lenses L1 to L5 are cemented together to form a cemented lens, thereby allowing increasing the number of aspheric surfaces. This allows higher freedom of design of each lens to preferably reduce the entire length of the lens.

Further, in a case where the lens configuration of the first to the fifth lenses L1 to L5 of the imaging lens L is set such that the full angle of view is 60 degrees or more, as shown in the example shown in FIG. 5, for example, the imaging lens L is preferably applicable to a mobile phone terminal, etc., which is often used to image a close object.

Next, operation and effects related to condition expressions of the imaging lens L having the above-described configuration are described in more detail.

First, it is preferred that a focal length f3 of the third lens L3 and a focal length f of the entire system satisfy the condition expression (1) below, and the focal length f of the entire system and a distance D7 between the third lens L3 and the fourth lens L4 along the optical axis satisfy the condition expression (2) below:

$$0 < f/f3 < 0.6 \quad (1), \text{ and}$$

$$0.12 < D7/f < 0.3 \quad (2).$$

The condition expression (1) defines a preferred numerical range of the ratio of the focal length f of the entire system relative to the focal length f3 of the third lens L3. Setting the refractive power of the third lens L3 such that the value of f/f3 does not become equal to or lower than the lower limit of the condition expression (1) allows preferably reducing the entire length. Setting the refractive power of the third lens L3 such that the value of f/f3 does not become equal to or greater than the upper limit of the condition expression (1) allows successfully correcting spherical aberration.

When the imaging lens is configured such that the condition expression (1) is satisfied, successful correction of spherical aberration can be achieved while reducing the entire length of the lens system. In order to enhance the above-described advantageous effects, it is more preferred that the condition expression (1-1) below be satisfied, and it is even more preferred that the condition expression (1-2) below be satisfied:

$$0 < f/f3 < 0.5 \quad (1-1),$$

$$0 < f/f3 < 0.4 \quad (1-2).$$

The condition expression (2) defines a preferred numerical range of the ratio of the distance D7 between the third lens L3 and the fourth lens L4 along the optical axis relative to the focal length f of the entire system. Setting the distance D7 between the third lens L3 and the fourth lens L4 along the optical axis relative to the focal length f of the entire system such that the value of D7/f does not become equal to or lower than the lower limit of the condition expression (2) allows preferably suppressing distortion which tend to occur when the entire length is reduced. Setting the distance D7 between the third lens L3 and the fourth lens L4 along the optical axis relative to the focal length f of the entire system such that the value of D7/f does not become equal to or greater than the upper limit of the condition expression (2) allows successfully correcting astigmatism.

When the imaging lens is configured such that the condition expression (2) is satisfied, successful correction of astigmatism can be achieved while reducing the entire length of the lens system. In order to enhance the above-described advantageous effects, it is more preferred that the condition expression (2-1) below be satisfied, and it is even more preferred that the condition expression (2-2) below be satisfied:

$$0.13 < D7/f < 0.25 \quad (2-1),$$

$$0.14 < D7/f < 0.2 \quad (2-2).$$

It is preferred that a focal length f1 of the first lens L1 and the focal length f of the entire system satisfy the condition expression (3) below:

$$1.5 < f/f1 < 3 \quad (3).$$

The condition expression (3) defines a preferred numerical range of the ratio of the focal length f of the entire system relative to the focal length f1 of the first lens L1. When the refractive power of the lens L1 is set such that the value of f/f1 does not become equal to or lower than the lower limit of the condition expression (3), the refractive power of the lens L1 does not become excessively weak relative to the refractive power of the entire system, and this allows preferably reducing the entire length. When the refractive power of the lens L1 is set such that the value of f/f1 does not become equal to or greater than the upper limit of the condition expression (3), the refractive power of the lens L1 does not become excessively strong relative to the refractive power of the entire system, and this allows successfully correcting spherical aberration.

When the imaging lens is configured such that the condition expression (3) is satisfied, the entire length of the lens system can preferably be reduced while successfully correcting spherical aberration. In order to enhance the above-described advantageous effects, it is more preferred that the condition expression (3-1) below be satisfied, and it is even more preferred that the condition expression (3-2) below be satisfied:

$$1.7<f/f1<2.7 \quad (3\text{-}1),$$

$$1.85<f/f1<2.5 \quad (3\text{-}2).$$

It is preferred that a focal length f5 of the first lens L5 and the focal length f of the entire system satisfy the condition expression (4) below:

$$-5<f/f5<-1 \quad (4).$$

The condition expression (4) defines a preferred numerical range of the ratio of the focal length f of the entire system relative to the focal length f5 of the first lens L5. When the refractive power of the fifth lens L5 is set such that the value of f/f5 does not become equal to or lower than the lower limit of the condition expression (4), the refractive power of the fifth lens L5 does not become excessively strong relative to the refractive power of the entire system, and this allows preferably suppressing increase of the incidence angle of rays traveling through the optical system onto the image plane (the image sensor) at the intermediate angle of view. When the refractive power of the fifth lens L5 is set such that the value of f/f5 does not become equal to or greater than the upper limit of the condition expression (4), the refractive power of the fifth lens L5 does not become excessively weak relative to the refractive power of the entire system. This is advantageous for reducing the entire length, and allows successful correction of field curvature.

When the imaging lens is configured such that the condition expression (4) is satisfied, field curvature can preferably be corrected while preferably suppressing increase of the incidence angle of rays traveling through the optical system onto the image plane (the image sensor) at the intermediate angle of view. In order to enhance the above-described advantageous effects, it is more preferred that the condition expression (4-1) below be satisfied, and it is even more preferred that the condition expression (4-2) below be satisfied:

$$-4<f/f5<-1.2 \quad (4\text{-}1),$$

$$-3.5<f/f5<-1.3 \quad (4\text{-}2).$$

It is preferred that the focal length f3 of the third lens L3 and the focal length f1 of the first lens L1 satisfy the condition expression (5) below:

$$0<f1/f3<0.5 \quad (5).$$

The condition expression (5) defines a preferred numerical range of the ratio of the focal length f1 of the first lens L1 relative to the focal length f3 of the third lens L3. When the positive refractive power of the first lens L1 is set such that the value of f1/f3 does not become equal to or lower than the lower limit of the condition expression (5), the positive refractive power of the lens L1 does not become excessively weak relative to the positive refractive power of the third lens L3, and this is advantageous for reducing the entire length. When the positive refractive power of the first lens L1 is set such that t the value of f1/f3 does not become equal to or greater than the upper limit of the condition expression (5), the positive refractive power of the lens L1 does not become excessively strong relative to the positive refractive power of the third lens L3, and this is advantageous for correcting spherical aberration.

When the imaging lens is configured such that the condition expression (5) is satisfied, the entire length of the lens system can preferably be reduced while successfully correcting spherical aberration. In order to enhance the above-described advantageous effects, it is more preferred that the condition expression (5-1) below be satisfied, and it is even more preferred that the condition expression (5-2) below be satisfied:

$$0<f1/f3<0.4 \quad (5\text{-}1),$$

$$0<f1/f3<0.3 \quad (5\text{-}2).$$

It is preferred that a paraxial radius of curvature R3f of the object-side surface of the third lens L3 and a paraxial radius of curvature R3r of the image-side surface of the third lens L3 satisfy the condition expression (6) below:

$$0<(R3f-R3r)/(R3f+R3r)<0.6 \quad (6).$$

The condition expression (6) defines a preferred numerical range about the paraxial radius of curvature R3f of the object-side surface of the third lens L3 and the paraxial radius of curvature R3r of the image-side surface of the third lens L3. Setting the paraxial radius of curvatures of the object side surface and the image-side surface of the third lens L3 such that the value of (R3f-R3r)/(R3f+R3r) does not become equal to or lower than the lower limit of the condition expression (6) is advantageous for reducing the entire length. Setting the paraxial radius of curvatures of the object side surface and the image-side surface of the third lens L3 such that the value of (R3f-R3r)/(R3f+R3r) does not become equal to or greater than the upper limit of the condition expression (6) allows successfully correcting spherical aberration.

When the imaging lens is configured such that the condition expression (6) is satisfied, the entire length of the lens system can preferably be reduced while successfully correcting spherical aberration. In order to enhance the above-described advantageous effects, it is more preferred that the condition expression (6-1) below be satisfied, and it is even more preferred that the condition expression (6-2) below be satisfied:

$$0<(R3f-R3r)/(R3f+R3r)<0.55 \quad (6\text{-}1),$$

$$0<(R3f-R3r)/(R3f+R3r)<0.5 \quad (6\text{-}2).$$

It is preferred that the focal length f of the entire system, a half angle of view ω, and a paraxial radius of curvature R5r of the image-side surface of the fifth lens satisfy the condition expression (7) below:

$$0.2<f \cdot \tan \omega / R5r<10 \quad (7).$$

The condition expression (7) defines a preferred numerical range of the ratio of a paraxial image height (f·tan ω) relative to the paraxial radius of curvature R5r of the image-side surface of the fifth lens L5. When the paraxial image height (f·tan ω) and the paraxial radius of curvature R5r of the image-side surface of the fifth lens L5 are set such that the value of f·tan ω/R5r does not become equal to or lower than the lower limit of the condition expression (7), the absolute value of the paraxial radius of curvature R5r of the image-side surface of the fifth lens L5, which is the most image-side surface of the imaging lens, does not become excessively large relative to the paraxial image height (f·tan ω), and this allows preferably correcting field curvature while reducing the entire length. When the paraxial image height (f·tan ω) and the paraxial radius of curvature R5r of the image-side surface of the fifth lens L5 are set such that the value of f·tan ω)/R5r does not become equal to or greater than the upper limit of the condition expression (7), the absolute value of the paraxial radius of curvature R5r of the image-side surface of the fifth lens L5, which is the most image-side surface of the imaging lens, does not become excessively small relative to the paraxial image height (f·tan ω), and this allows suppressing increase of the incidence angle of rays traveling through the optical system onto the image plane (the image sensor) at the intermediate angle of view.

When the imaging lens is configured such that the condition expression (7) is satisfied, reduction of the entire length can be achieved and field curvature can preferably be corrected while preferably suppressing increase of the incidence angle of rays traveling through the optical system onto the image plane (the image sensor) at the intermediate angle of view. In order to enhance the above-described advantageous effects, it is more preferred that the condition expression (7-1) below be satisfied, and it is even more preferred that the condition expression (7-2) below be satisfied:

$$0.5 < f \cdot \tan \omega / R5r < 5 \quad (7\text{-}1),$$

$$1 < f \cdot \tan \omega / R5r < 3 \quad (7\text{-}2).$$

It is preferred that a focal length f2 the second lens L2 and the focal length f of the entire system satisfy the condition expression (8) below:

$$-2 < f/f2 < -0.5 \quad (8).$$

The condition expression (8) defines a preferred numerical range of the ratio of the focal length f of the entire system relative to the focal length f2 of the second lens L2. When the refractive power of the second lens L2 is set such that the value of f/f2 does not become equal to or lower than the lower limit of the condition expression (8), the refractive power of the second lens L2 does not become excessively strong relative to the positive refractive power of the entire system, and this allows reducing the entire length. When the refractive power of the second lens L2 is set such that the value of f/f2 does not become equal to or greater than the upper limit of the condition expression (8), the refractive power of the second lens L2 does not become excessively weak relative to the refractive power of the entire system, and this is advantageous for correcting axial chromatic aberration.

When the imaging lens is configured such that the condition expression (8) is satisfied, axial chromatic aberration can preferably be corrected while reducing the entire length. In order to enhance the above-described advantageous effects, it is more preferred that the condition expression (8-1) below be satisfied, and it is even more preferred that the condition expression (8-2) below be satisfied:

$$-1.8 < f/f2 < -0.7 \quad (8\text{-}1),$$

$$-1.6 < f/f2 < -1 \quad (8\text{-}2).$$

Next, specific numerical examples of the imaging lens according to the embodiments of the disclosure are described. In the following description, several numerical examples are explained at once.

Tables 1 and 2 presented below show specific lens data corresponding to the configuration of the imaging lens shown in FIG. 1. Specifically, Table 1 shows basic lens data, and Table 2 shows data about aspheric surfaces. Each value in the column of surface number "Si" in the lens data shown in Table 1 of the imaging lens according to Example 1 is the surface number of the i-th surface, where the surface of the aperture stop St is the 1st surface, the most object-side lens surface (the object-side surface of the lens L1) is the 2nd surface, and the number is sequentially increased toward the image side. Each value in the column of radius of curvature "Ri", which corresponds to each symbol "Ri" shown in FIG. 1, is the value (mm) of radius of curvature of the i-th surface. Each value in the column of surface distance "Di" is the surface distance (mm) between the i-th surface Si and the i+1-th surface Si+1 from the object side along the optical axis. Each value in the column of "Ndj" is the value of refractive index with respect to the d-line (the wavelength of 587.56 nm) of the j-th optical element from the object side. Each value in the column of "vdj" is the value of Abbe number with respect to the d-line of the j-th element from the object side. The sign with respect to the radius of curvature is provided such that a positive radius of curvature indicates a surface shape that is convex toward the object side, and a negative radius of curvature indicates a surface shape that is convex toward the image side.

As relevant data, values of the focal length f of the entire system (mm), back focus Bf (mm), F-number Fno., full angle of view 2ω (°), and the entire lens length TL (mm) are shown above the frame of Table 1. It should be noted that the value of the back focus Bf is an equivalent air distance. The entire lens length TL is a distance from the object-side surface of the lens L1 to the image plane along the optical axis, and a portion corresponding to the back focus Bf in the entire lens length TL is the equivalent air distance.

Each of the first to the fifth lenses L1 to L5 of the imaging lens according to Example 1 has aspheric surfaces on both sides. The value of radius of curvature of each aspheric surface in the basic lens data shown in Table 1 is a value of radius of curvature in the vicinity of the optical axis (paraxial radius of curvature).

Table 2 shows aspheric surface data of the imaging lens of Example 1. In each value shown as the aspheric surface data, the symbol "E" means that the numerical value following the symbol "E" is an exponent with the base being 10, and that the numerical value before the symbol "E" is multiplied by the numerical value represented by the exponential function with the base being 10. For example, "1.0E-02" means "1.0×10⁻²."

As the aspheric surface data, values of coefficients An and K in the formula of aspheric shape expressed as the formula (A) below are shown. More specifically, Z represents a length (mm) of a perpendicular line from a point on the aspheric surface at a height h from the optical axis to a plane perpendicular to the optical axis and tangential to the apex of the aspheric surface.

$$Z = C \cdot h^2 / \{1 + (1 - K \cdot C^2 \cdot h^2)^{1/2}\} + \Sigma An \cdot h^n \quad (A),$$

where Z is a depth (mm) of the aspheric surface, h is a distance (mm) from the optical axis to the lens surface (height), C is a paraxial curvature=1/R (where R is a paraxial radius of curvature), An is an n-th order (where n is an integer of 3 or more) aspheric coefficient, and K is an aspheric coefficient.

Similarly to the lens data of the imaging lens of Example 1 described above, specific lens data corresponding to the configurations of imaging lens shown in FIG. 2 is shown as Example 2 in Tables 3 and 4. Similarly, specific lens data corresponding to the configurations of imaging lenses shown in FIGS. 3 and 4 are shown as Examples 3 and 4, respectively, in Tables 5 to 8. In the imaging lenses according to Examples 1 to 4, each of the first to the fifth lenses L1 to L5 has aspheric surfaces on both sides.

Figure 6:
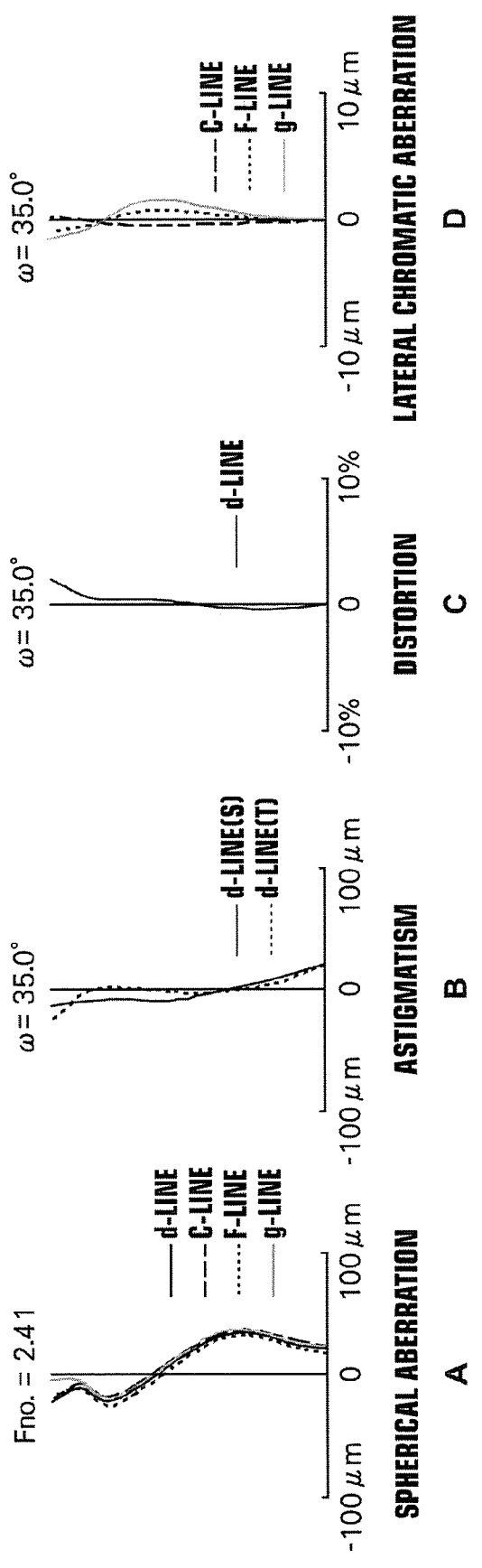
FIG. 6 shows aberration diagrams of the imaging lens according to Example 1 of the disclosure, where spherical aberration is shown at A, astigmatism is shown at B, distortion is shown at C, and lateral chromatic aberration is shown at D.

FIG. 6 shows, at A to D, aberration diagrams of spherical aberration, astigmatism, distortion, and lateral chromatic aberration (chromatic aberration of magnification), respectively, of the imaging lens of Example 1. Each aberration shown in the aberration diagrams of spherical aberration, astigmatism, and distortion is with respect to the d-line (the wavelength of 587.56 nm) used as the reference wavelength.

The aberration diagrams of spherical aberration and lateral chromatic aberration also show the aberrations with respect to the F-line (the wavelength of 486.1 nm), the C-line (the wavelength of 656.27 nm), and the g-line (the wavelength of 435.83 nm). In the aberration diagram of astigmatism, the aberration in the sagittal direction (S) is shown in the solid line and the aberration in the tangential direction (T) is shown in the dotted line. The symbol "Fno." means "F-number" and the symbol "ω" means "half angle of view."

Figure 7:
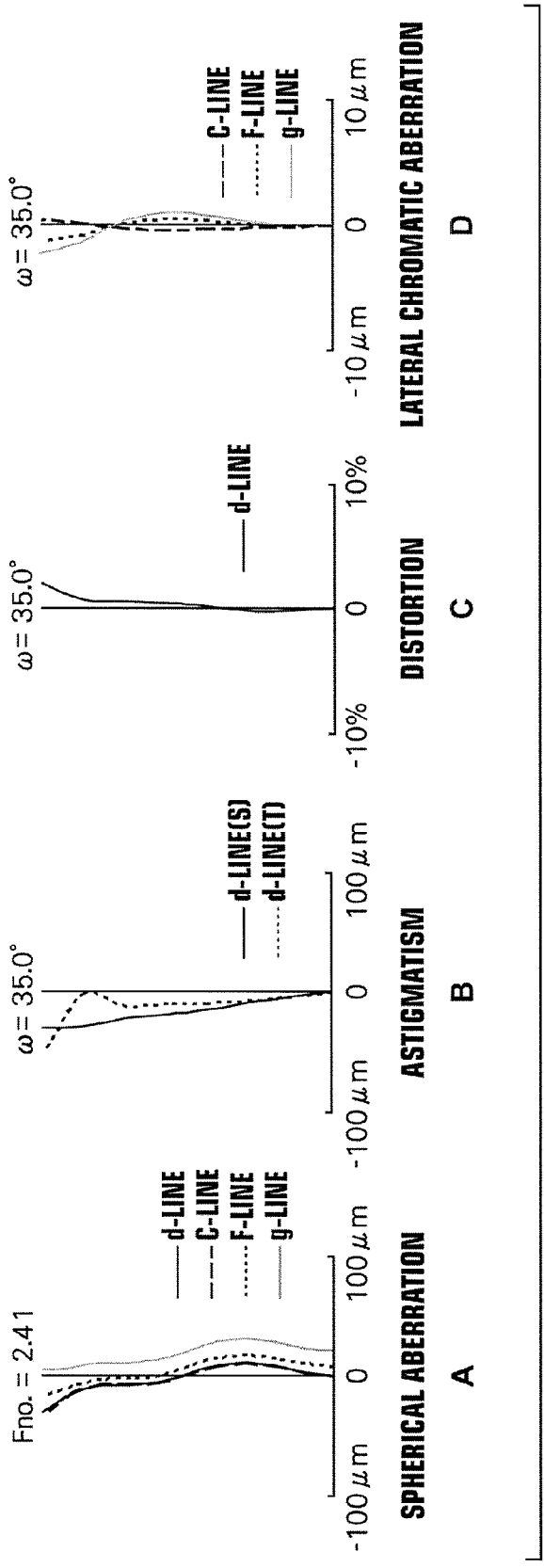
FIG. 7 shows aberration diagrams of the imaging lens according to Example 2 of the disclosure, where spherical aberration is shown at A, astigmatism is shown at B, distortion is shown at C, and lateral chromatic aberration is shown at D.
Figure 8:
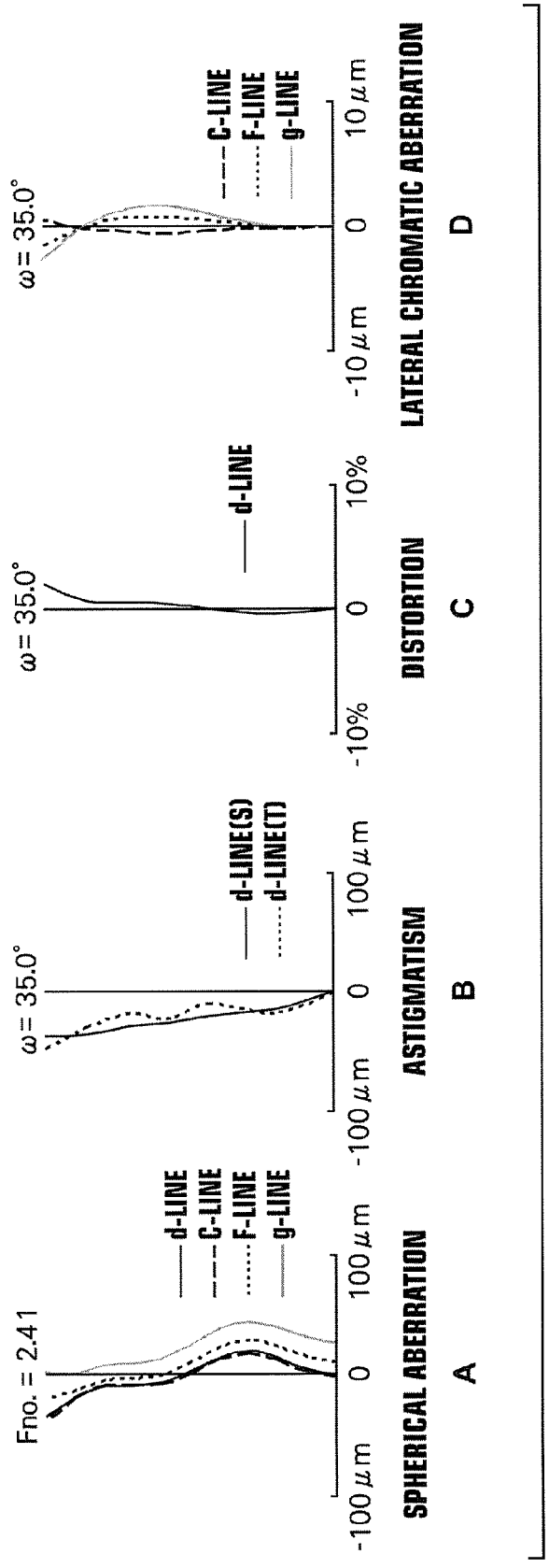
FIG. 8 shows aberration diagrams of the imaging lens according to Example 3 of the disclosure, where spherical aberration is shown at A, astigmatism is shown at B, distortion is shown at C, and lateral chromatic aberration is shown at D.
Figure 9:
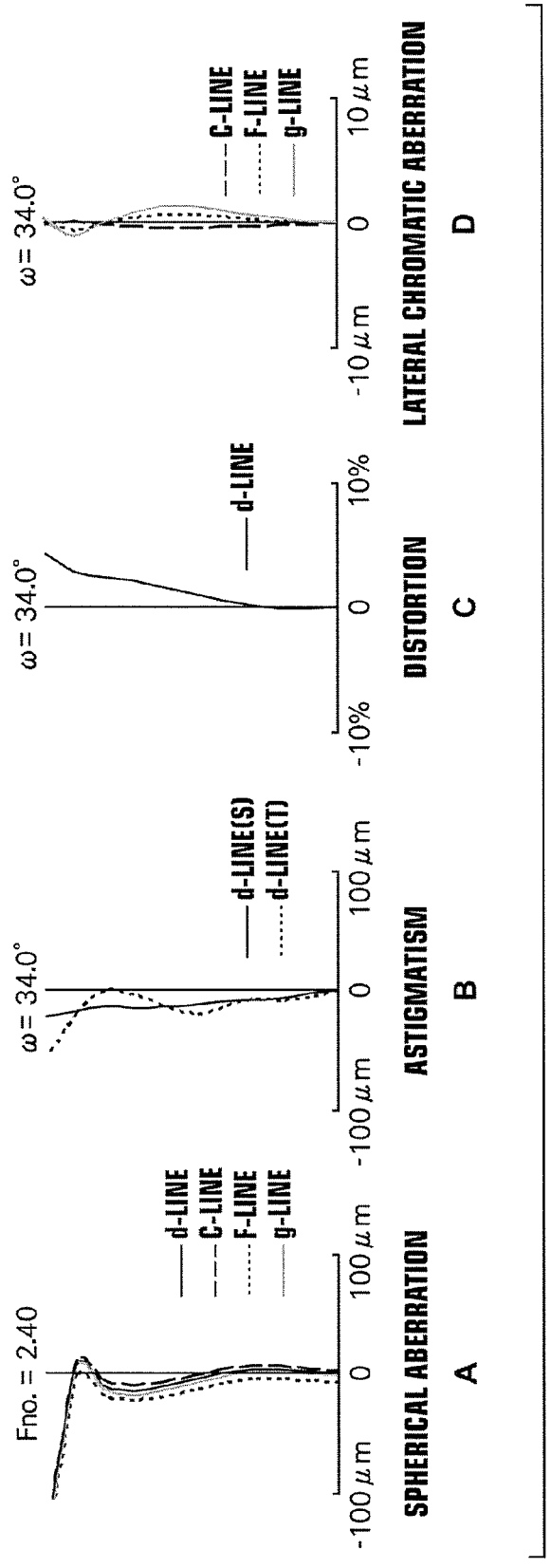
FIG. 9 shows aberration diagrams of the imaging lens according to Example 4 of the disclosure, where spherical aberration is shown at A, astigmatism is shown at B, distortion is shown at C, and lateral chromatic aberration is shown at D.

Similarly, the various aberrations of the imaging lenses of Examples 2 to 4 are shown at A to D in FIGS. 7 to 9. All the aberration diagrams shown at A to D in FIGS. 6 to 9 show aberrations when the object distance is infinity.

Further, Table 9 shows values relating to the conditional expressions (1) to (8) according to the disclosure for each of Examples 1 to 4.

As can be seen from the numerical data and the aberration diagrams, the imaging lens of each of Examples 1 to 4 has a value of TL/f, which is the ratio of the entire lens length TL to the focal length f of the entire system, in the range from 1.01 to 1.03, and achieves high imaging performance with successfully corrected aberrations while reducing the entire length.

It should be noted that the imaging lens of the invention is not limited to the above-described embodiments and examples, and various medications may be made to the disclosure to carry out the invention. For example, the values of the radius of curvature, the surface distance, the refractive index, the Abbe number, the aspheric coefficients, etc., of each lens component are not limited to the values shown in the numerical examples and may take different values.

Further, while the imaging lenses of the above-described examples are described on the assumption that they are used as fixed-focus lenses, the imaging lens of the invention can be configured to allow focusing. For example, automatic focusing can be achieved by moving the entire lens system or moving part of the lenses forming the lens system along the optical axis.

TABLE 1

Example 1
f = 4.161, Bf = 1.319, Fno. = 2.41, 2ω = 70.0, TL = 4.298

| Si | Ri | Di | Ndj | vdj |
|---|---|---|---|---|
| 1 (aperture stop) | ∞ | −0.329 | | |
| *2 | 1.30879 | 0.480 | 1.544 | 55.9 |
| *3 | −31.74999 | 0.102 | | |
| *4 | −54.30018 | 0.200 | 1.634 | 23.8 |
| *5 | 2.41282 | 0.375 | | |
| *6 | −7.98740 | 0.381 | 1.634 | 23.8 |
| *7 | −7.38751 | 0.593 | | |
| *8 | −4.32852 | 0.301 | 1.544 | 55.9 |
| *9 | −1.04953 | 0.330 | | |
| *10 | −2.15016 | 0.217 | 1.544 | 55.9 |
| *11 | 2.21156 | 1.100 | | |
| 12 | ∞ | 0.300 | 1.517 | 64.2 |
| 13 | ∞ | 0.000 | | |
| 14 (image plane) | ∞ | | | |

*aspheric surface

TABLE 2

Example 1

| | Surface No. | | | | |
|---|---|---|---|---|---|
| | 2 | 3 | 4 | 5 | 6 |
| KA | −3.2840570E+00 | −4.9080244E+03 | 1.3673209E+03 | 7.5103505E+00 | 8.6234646E+00 |
| A4 | 2.3249128E−01 | 2.1684954E−02 | 2.5253463E−02 | −4.6623925E−02 | −1.6846512E−01 |
| A6 | −6.5725463E−02 | 4.1952954E−02 | 1.0519749E−01 | 1.1892149E−01 | −5.2650516E−02 |
| A8 | 3.0020555E−03 | −3.9662271E−02 | −4.3538391E−02 | −8.4139268E−02 | 1.1954399E−01 |
| A10 | 1.9290445E−02 | 3.2487386E−02 | −1.3379753E−01 | −4.7358865E−02 | 7.2238024E−02 |
| A12 | 1.4560101E−01 | −1.2224883E−01 | −2.0472502E−01 | −1.9954892E−01 | 2.1192731E−02 |
| A14 | −1.5989871E−01 | 3.4940718E−02 | 3.0889551E−01 | 2.6481256E−01 | −7.7932208E−02 |
| A16 | 0.0000000E+00 | 0.0000000E+00 | 0.0000000E+00 | 0.0000000E+00 | 0.0000000E+00 |

| | Surface No. | | | | |
|---|---|---|---|---|---|
| | 7 | 8 | 9 | 10 | 11 |
| KA | 5.0667259E+01 | 8.3170980E+00 | −2.7562475E+00 | −7.5169207E+00 | −2.9897113E+01 |
| A4 | −1.3308137E−01 | −3.6302538E−02 | −3.5587565E−03 | 1.9882258E−02 | −5.7649918E−02 |
| A6 | −1.0420644E−02 | −1.8572529E−03 | 6.0410559E−02 | −7.2783985E−03 | 1.2506477E−02 |
| A8 | 4.5463937E−02 | −3.9462780E−02 | −2.8994467E−02 | 1.9332581E−03 | −3.1743483E−03 |
| A10 | 3.8125142E−02 | 3.2605836E−02 | 5.1317655E−03 | −1.3671127E−04 | 2.9266443E−04 |
| A12 | 3.3923060E−02 | 2.3838611E−04 | −3.7112367E−04 | −1.5773436E−05 | 5.7144308E−06 |
| A14 | 1.1521292E−03 | −2.5013665E−03 | −4.1378170E−05 | 2.2972038E−06 | 1.6904993E−06 |
| A16 | 0.0000000E+00 | 0.0000000E+00 | 0.0000000E+00 | 0.0000000E+00 | 0.0000000E+00 |

TABLE 3

Example 2
f = 4.201, Bf = 1.299, Fno. = 2.41, 2ω = 70.0, TL = 4.299

| Si | Ri | Di | Ndj | νdj |
|---|---|---|---|---|
| 1 (aperture stop) | ∞ | −0.329 | | |
| *2 | 1.34266 | 0.387 | 1.544 | 55.9 |
| *3 | −8.58169 | 0.088 | | |
| *4 | −30.61767 | 0.200 | 1.634 | 23.8 |
| *5 | 2.21569 | 0.529 | | |
| *6 | −9.09332 | 0.336 | 1.634 | 23.8 |
| *7 | −7.45786 | 0.670 | | |
| *8 | −3.34064 | 0.261 | 1.544 | 55.9 |

TABLE 3-continued

Example 2
f = 4.201, Bf = 1.299, Fno. = 2.41, 2ω = 70.0, TL = 4.299

| Si | Ri | Di | Ndj | νdj |
|---|---|---|---|---|
| *9 | −0.98453 | 0.329 | | |
| *10 | −2.00189 | 0.200 | 1.544 | 55.9 |
| *11 | 2.28571 | 1.100 | | |
| 12 | ∞ | 0.300 | 1.517 | 64.2 |
| 13 | ∞ | 0.000 | | |
| 14 (image plane) | ∞ | | | |

*aspheric surface

TABLE 4

Example 2

| | Surface No. | | | | |
|---|---|---|---|---|---|
| | 2 | 3 | 4 | 5 | 6 |
| KA | −3.2063270E+00 | −2.6603771E+02 | 7.1218117E+02 | 6.3341257E+00 | 2.9169116E+01 |
| A4 | 2.1932444E−01 | 1.9791771E−02 | 2.3293449E−03 | −1.1235581E−01 | −1.7543339E−01 |
| A6 | −6.7907471E−02 | 2.5346572E−02 | 1.0228139E−01 | 1.5555563E−01 | −2.4135660E−02 |
| A8 | 8.0873815E−03 | −3.1585726E−02 | −1.1434160E−03 | −8.9059798E−02 | 9.9442135E−02 |
| A10 | 1.7879906E−03 | 8.4304957E−02 | −7.3992276E−02 | −4.8008765E−02 | 1.1970404E−01 |
| A12 | 1.2116206E−01 | −8.3308008E−02 | −1.8389653E−01 | −2.3416821E−01 | 5.3907558E−02 |
| A14 | −5.5284165E−02 | 1.3524320E−02 | 1.7600070E−01 | 1.3348570E−01 | −1.8640081E−01 |
| A16 | 0.0000000E+00 | 0.0000000E+00 | 0.0000000E+00 | 0.0000000E+00 | 0.0000000E+00 |

| | Surface No. | | | | |
|---|---|---|---|---|---|
| | 7 | 8 | 9 | 10 | 11 |
| KA | 4.8343181E+01 | 3.0188898E+00 | −2.5312330E+00 | −1.1108612E+01 | −2.9122046E+01 |
| A4 | −1.3331537E−01 | −4.4124136E−02 | −1.6116580E−02 | 6.5497858E−03 | −6.1791574E−02 |
| A6 | −1.9567957E−02 | 3.7862002E−03 | 5.8262410E−02 | −6.7496945E−03 | 1.1808867E−02 |
| A8 | 7.1112136E−02 | −4.3094909E−02 | −2.8014422E−02 | 2.0874952E−03 | −2.8907327E−03 |
| A10 | 5.3381122E−02 | 3.1621065E−02 | 5.6230378E−03 | −1.1854505E−04 | 2.7771414E−04 |
| A12 | 3.2545623E−02 | 4.9414590E−04 | −2.4339938E−04 | −1.6565242E−05 | −7.7094020E−06 |
| A14 | −2.4581923E−02 | −2.1385952E−03 | −3.7834991E−05 | 7.9929912E−07 | 1.2209356E−06 |
| A16 | 0.0000000E+00 | 0.0000000E+00 | 0.0000000E+00 | 0.0000000E+00 | 0.0000000E+00 |

TABLE 5

Example 3
f = 4.198, Bf = 1.298, Fno. = 2.41, 2ω = 70.0, TL = 4.297

| Si | Ri | Di | Ndj | νdj |
|---|---|---|---|---|
| 1 (aperture stop) | ∞ | −0.329 | | |
| *2 | 1.32502 | 0.498 | 1.544 | 55.9 |
| *3 | −6.39502 | 0.055 | | |
| *4 | −13.43033 | 0.200 | 1.634 | 23.8 |
| *5 | 2.02977 | 0.407 | | |
| *6 | −20.07914 | 0.224 | 1.634 | 23.8 |
| *7 | −7.41746 | 0.876 | | |
| *8 | −17.49205 | 0.391 | 1.544 | 55.9 |
| *9 | −0.87780 | 0.143 | | |
| *10 | −1.15602 | 0.205 | 1.544 | 55.9 |
| *11 | 2.18741 | 1.100 | | |
| 12 | ∞ | 0.300 | 1.517 | 64.2 |
| 13 | ∞ | 0.000 | | |
| 14 (image plane) | ∞ | | | |

*aspheric surface

TABLE 6

Example 3

| | Surface No. | | | | |
|---|---|---|---|---|---|
| | 2 | 3 | 4 | 5 | 6 |
| KA | −3.4887066E+00 | −2.0372622E+02 | 1.2938531E+02 | 4.5786401E+00 | 5.3395407E+02 |
| A4 | 2.4057431E−01 | 2.4014645E−02 | 7.7315613E−03 | −1.5592300E−01 | −2.4368213E−01 |

TABLE 6-continued

Example 3

| | | | | | |
|---|---|---|---|---|---|
| A6 | −8.1154332E−02 | 4.7196342E−02 | 1.6196312E−01 | 3.0962513E−01 | 1.3070219E−01 |
| A8 | −5.5692811E−03 | −2.3507685E−04 | −7.6843673E−02 | −3.2704077E−01 | −2.0751928E−01 |
| A10 | 3.0343883E−02 | 4.5058668E−02 | −1.0880257E−01 | 5.0389271E−02 | 1.8803017E−01 |
| A12 | 1.7357156E−01 | −1.9809017E−01 | −1.1579168E−01 | −3.0777038E−02 | 5.3075490E−01 |
| A14 | −1.4997032E−01 | 8.8472460E−02 | 1.6672223E−01 | 1.5716758E−01 | −4.5361889E−01 |
| A16 | 0.0000000E+00 | 0.0000000E+00 | 0.0000000E+00 | 0.0000000E+00 | 0.0000000E+00 |

| | Surface No. | | | | |
|---|---|---|---|---|---|
| | 7 | 8 | 9 | 10 | 11 |
| KA | 5.8107139E+01 | 9.6262968E+01 | −2.4355781E+00 | −3.7189675E+00 | −3.0770637E+01 |
| A4 | −1.8343421E−01 | −1.8243760E−01 | −4.9740510E−02 | 2.4879091E−02 | −6.9016962E−02 |
| A6 | 1.0382915E−01 | 7.7594938E−02 | 4.4986356E−02 | −7.1722005E−03 | 1.4153212E−02 |
| A8 | −7.9873656E−02 | −5.3650777E−02 | −2.5590476E−02 | 1.8836560E−03 | −3.4211094E−03 |
| A10 | 6.4440668E−02 | 7.1871384E−03 | 7.9016391E−03 | −1.1374960E−04 | 2.4031438E−04 |
| A12 | 2.2894711E−01 | −9.5478118E−04 | 2.8862971E−04 | −1.1859333E−05 | −4.1393964E−07 |
| A14 | −9.2138306E−02 | 2.0825439E−03 | −4.6087356E−04 | 1.1300339E−06 | 6.6830370E−06 |
| A16 | 0.0000000E+00 | 0.0000000E+00 | 0.0000000E+00 | 0.0000000E+00 | 0.0000000E+00 |

TABLE 7

Example 4
f = 4.249, Bf = 1.121, Fno. = 2.40, 2ω = 68.0, TL = 4.304

| Si | Ri | Di | Ndj | vdj |
|---|---|---|---|---|
| 1 (aperture stop) | ∞ | −0.237 | | |
| *2 | 1.39735 | 0.762 | 1.54340 | 56.04 |
| *3 | −6.90532 | 0.071 | | |
| *4 | −5.81296 | 0.157 | 1.63551 | 23.90 |
| *5 | 3.08720 | 0.309 | | |
| *6 | −2.84254 | 0.347 | 1.63551 | 23.90 |
| *7 | −2.35227 | 0.699 | | |
| *8 | −1.28531 | 0.120 | 1.54340 | 56.04 |

TABLE 7-continued

Example 4
f = 4.249, Bf = 1.121, Fno. = 2.40, 2ω = 68.0, TL = 4.304

| Si | Ri | Di | Ndj | vdj |
|---|---|---|---|---|
| *9 | −0.90768 | 0.618 | | |
| *10 | 35.14900 | 0.100 | 1.54340 | 56.04 |
| *11 | 1.48473 | 0.500 | | |
| 12 | ∞ | 0.300 | 1.51680 | 64.20 |
| 13 | ∞ | 0.424 | | |
| 14 (image plane) | ∞ | | | |

*aspheric surface

TABLE 8

Example 4

| | Surface No. | | | | |
|---|---|---|---|---|---|
| | 2 | 3 | 4 | 5 | 6 |
| KA | −5.0308512E+00 | −9.0000088E+00 | 1.1000009E+01 | 1.1000002E+01 | −9.0000082E+00 |
| A4 | 2.6776183E−01 | 2.8661247E−02 | 8.6320933E−02 | −2.9715640E−03 | −3.3242412E−01 |
| A6 | −2.0946358E−01 | −9.7747744E−02 | −1.0556282E−01 | 5.1898505E−02 | −1.0455811E−01 |
| A8 | 1.5261242E−01 | −1.5240743E−01 | 1.6945607E−01 | 9.5596204E−02 | 2.5757813E−01 |
| A10 | −3.0728044E−02 | 2.7345650E−01 | −6.1229755E−01 | −3.2079715E−01 | −2.2749978E−01 |
| A12 | −6.5186407E−02 | −3.5190557E−01 | 8.2649152E−01 | 4.1935659E−01 | 8.7071658E−02 |
| A14 | −1.9121372E−02 | 1.2982817E−01 | −4.5039136E−01 | −1.8773877E−01 | |

| | Surface No. | | | | |
|---|---|---|---|---|---|
| | 7 | 8 | 9 | 10 | 11 |
| KA | 3.8000222E+00 | 1.1455439E+00 | −1.1274096E+00 | −2.9000009E+01 | −9.0000090E+00 |
| A4 | −1.8238610E−01 | 9.9202037E−02 | 8.8552282E−02 | −5.6405157E−02 | −8.1295135E−02 |
| A6 | −5.2919477E−02 | 1.2452311E−01 | 9.9166134E−02 | 1.7870124E−02 | 3.1321367E−02 |
| A8 | 1.1974003E−01 | −1.9618932E−01 | −1.1529137E−01 | −5.1557564E−03 | −1.0885263E−02 |
| A10 | −4.5653906E−02 | 1.9916849E−01 | 4.3410481E−02 | 1.3262844E−03 | 2.2083524E−03 |
| A12 | 1.5093614E−02 | −9.6026169E−02 | −9.5689140E−03 | −1.9462584E−04 | −2.5191942E−04 |
| A14 | | 1.6889931E−02 | 6.7956382E−04 | 1.1032805E−05 | 1.2398343E−05 |

TABLE 9

Values relating to condition expressions

| No. | Condition Expression | Example 1 | Example 2 | Example 3 | Example 4 |
|---|---|---|---|---|---|
| (1) | f/f3 | 0.033 | 0.069 | 0.228 | 0.252 |
| (2) | d6/f | 0.143 | 0.159 | 0.159 | 0.165 |
| (3) | f/f1 | 1.792 | 1.941 | 2.034 | 1.922 |
| (4) | f/f5 | −2.113 | −2.176 | −3.085 | −1.488 |
| (5) | f1/f3 | 0.018 | 0.036 | 0.112 | 0.131 |
| (6) | R3f − R3r/ R3f + R3r | 0.039 | 0.099 | 0.460 | 0.094 |
| (7) | f · tanω/R5r | 1.317 | 1.287 | 1.344 | 1.930 |
| (8) | f/f2 | −1.144 | −1.292 | −1.517 | −1.348 |

What is claimed is:

1. An imaging lens consisting of five lenses consisting of, in order from an object side:
    a first lens having a biconvex shape;
    a second lens having a biconcave shape;
    a third lens having a positive refractive power and having a meniscus shape with the convex surface toward an image side;
    a fourth lens having a positive refractive power and having a meniscus shape with the convex surface toward the image side; and
    a fifth lens having a negative refractive power, having a concave surface toward the image side, and having at least one inflection point on the image-side surface thereof,
    wherein the condition expression below is satisfied:

$0 < f/f3 < 0.6$ (1), and $0.12 < D7/f < 0.3$ (2), where f is a focal length of the entire system, f3 is a focal length of the third lens, and D7 is a distance between the third lens and the fourth lens along the optical axis.

2. The imaging lens as claimed in claim 1, wherein the condition expression below is further satisfied:

$1.5 < f/f1 < 3$ (3), where f1 is a focal length of the first lens.

3. The imaging lens as claimed in claim 1, wherein the condition expression below is further satisfied:

$-5 < f/f5 < -1$ (4), where f5 is a focal length of the fifth lens.

4. The imaging lens as claimed in claim 1, wherein the condition expression below is further satisfied:

$0 < f1/f3 < 0.5$ (5), where f1 is a focal length of the first lens.

5. The imaging lens as claimed in claim 1, wherein the condition expression below is further satisfied:

$0 < (R3f - R3r)/(R3f + R3r) < 0.6$ (6), where R3f is a paraxial radius of curvature of the object-side surface of the third lens, and R3r is a paraxial radius of curvature of the image-side surface of the third lens.

6. The imaging lens as claimed in claim 1, wherein the condition expression below is further satisfied:

$0.2 < f \cdot \tan\omega/R5r < 10$ (7), where ω is a half angle of view, and R5r is a paraxial radius of curvature of the image-side surface of the fifth lens.

7. The imaging lens as claimed in claim 1, wherein the condition expression below is further satisfied:

$-2 < f/f2 < -0.5$ (8), where f2 is a focal length of the second lens.

8. The imaging lens as claimed in claim 1, wherein an aperture stop is disposed on the object side of the object-side surface of the second lens.

9. The imaging lens as claimed in claim 1, wherein the condition expression below is further satisfied:

$0 < f/f3 < 0.5$ (1-1).

10. The imaging lens as claimed in claim 1, wherein the condition expression below is further satisfied:

$0.13 < D7/f < 0.25$ (2-1).

11. The imaging lens as claimed in claim 1, wherein the condition expression below is further satisfied:

$1.7 < f/f1 < 2.7$ (3-1), where f1 is a focal length of the first lens.

12. The imaging lens as claimed in claim 1, wherein the condition expression below is further satisfied:

$-4 < f/f5 < -1.2$ (4-1), where f5 is a focal length of the fifth lens.

13. The imaging lens as claimed in claim 1, wherein the condition expression below is further satisfied:

$0 < f1/f3 < 0.4$ (5-1), where f1 is a focal length of the first lens.

14. The imaging lens as claimed in claim 1, wherein the condition expression below is further satisfied:

$0 < (R3f - R3r)/(R3f + R3r) < 0.55$ (6-1), where R3f is a paraxial radius of curvature of the object-side surface of the third lens, and R3r is a paraxial radius of curvature of the image-side surface of the third lens.

15. The imaging lens as claimed in claim 1, wherein the condition expression below is further satisfied:

$0.5 < f \cdot \tan\omega/R5r < 5$ (7-1), where ω is a half angle of view, and R5r is a paraxial radius of curvature of the image-side surface of the fifth lens.

16. The imaging lens as claimed in claim 1, wherein the condition expression below is further satisfied:

$-1.8 < f/f2 < -0.7$ (8-1), where f2 is a focal length of the second lens.

17. The imaging lens as claimed in claim 1, wherein the condition expression below is further satisfied:

$0 < f/f3 < 0.4$ (1-2).

18. The imaging lens as claimed in claim 1, wherein the condition expression below is further satisfied:

$0.14 < D7/f < 0.2$ (2-2).

19. The imaging lens as claimed in claim 1, wherein the condition expression below is further satisfied:

$1.85 < f/f1 < 2.5$ (3-2), where f1 is a focal length of the first lens.

20. An imaging apparatus comprising the imaging lens as claimed in claim 1.

* * * * *